United States Patent [19]
Hayashi et al.

[11] 3,953,407
[45] Apr. 27, 1976

[54] PROCESS FOR PREPARING PAPER SIZE RESIN

[75] Inventors: Hideo Hayashi; Hisatake Sato; Shiro Saito, all of Yokohama, Japan

[73] Assignee: Nippon Oil Co., Ltd., Tokyo, Japan

[22] Filed: July 9, 1974

[21] Appl. No.: 486,746

[30] Foreign Application Priority Data
July 16, 1973  Japan.............................. 48-79297

[52] U.S. Cl................................. 526/22; 526/44; 526/45; 526/56; 526/271; 526/290; 526/317
[51] Int. Cl.².................. C08F 8/46; C08F 240/00
[58] Field of Search.................. 260/78.4 D, 94.7 A, 260/82; 450/610.5, 623, 776

[56] References Cited
UNITED STATES PATENTS
2,142,980  1/1939  Huijser et al. ................ 260/78.4 D
3,279,975  10/1966  Yoshii et al. ................... 260/78.4 D

OTHER PUBLICATIONS

Frazer, A. H. *High Temperature Resistant Polymers*, Interscience Publishers, N. Y., 1968, pp. 22–25.

*Primary Examiner*—Joseph L. Schofer
*Assistant Examiner*—Maria S. Tungol
*Attorney, Agent, or Firm*—Sherman & Shalloway

[57] ABSTRACT

A process for preparing a resin suitable for preparation of sizes, which comprises polymerizing a cracked oil fraction which is obtained by the thermal cracking of petroleums, has a boiling point of 20° to 220°C., and contains diolefins, thereby to form a hydrocarbon resin, reacting the resulting hydrocarbon resin with an unsaturated dicarboxylic acid or its anhydride, and heating the acid-modified resin in the presence of water or an alkali metal hydroxide at a temperature of 130° to 350°C.

9 Claims, No Drawings

PROCESS FOR PREPARING PAPER SIZE RESIN

This invention relates to a process for preparing a resin for paper sizes having superior, or equal, properties to conventional natural rosin-type paper sizes on the basis of a novel synthesizing method.

Most of paper sizes now commercially used are prepared from natural rosin, and include a size obtained by saponifying rosin with alkali, or a strengthened size obtained by adding a small amount of maleic anhydride to rosin, and then saponifying the resulting adduct.

However, the cost of natural rosin is constantly rising because of its worldwide shortage, and it has been desired all over the world to synthesize resins for preparation of paper sizes having properties comparable to those of the rosin-type paper sizes.

One attempt to synthesize them is to prepare a petroleum resin paper size by adding maleic anhydride to a petroleum resin, and saponifying the resulting adduct together with rosin, etc. However, this method requires the use of a great amount of maleic anhydride in order to water-solubilize the petroleum resin alone, and because of this, the sizing effect is extremely reduced. Thus, it has been the practice to solubilize the petroleum resin with rosin soap by saponification with the conjoint use of rosin and a reduced amount of maleic anhydride (Japanese Pat. No. 32762/70), or to use a methylene cross-linked product of maleicmodified petroleum resin and rosin (Japanese Pat. No. 1342/67). However, these "petroleum resin sizes" are merely a combination of the petroleum resin and rosin. Furthermore, during the paper making process using such a size, undesirable phenomena such as gum-up phenomenon occur, and the size is far inferior in properties than the rosin size.

On the other hand, when a petroleum resin in which the amount of maleic anhydride added is increased in used as a sizing agent, it has been attempted to convert part of the added maleic acid group to an aluminum, magnesium or calcium salt and then saponify the salt with alkali (Japanese Pat. No. 39041/70), or to react urea with a part of the maleic acid group to form an amide linkage and then, saponifying the remaining maleic acid group with alkali (Japanese Pat. No. 5723/70). However, such a size cannot cope with the rosin-type sizes.

The great suitability of rosin as a resin for paper sizes is considered, for the major part, to be due to the fact that the main constituent of rosin is a compound containing one carboxyl group per molecule typically exemplified by abietic acid which can be converted to soap by saponification with alkali; namely, it is a so-called resin acid soap whose oleophilic group portion is a resin. However, conventional petroleum resin sizes do not meet all of these requirements.

The inventors of the present application noticed the basic properties of the rosin-type sizes, and made extensive work in order to synthesize paper size resins having the same function as rosin. This finally led to the accomplishment of the present invention.

According to this invention, there is provided a process for preparing a novel resin suitable as a paper size, which comprises polymerizing a cracked oil fraction obtainable by the thermal cracking of petroleums, having a boiling point of 20° to 220°C. and containing diolefins to form a hydrocarbon resin, reacting the hydrocarbon resin with an unsaturated dicarboxylic acid or its anhydride to form an acid-modified resin, and then heat-treating the acid-modified resin at a temperature of 130° to 350°C., preferably 150° to 280°C., in the presence of water or in the presence of an aqueous solution of an alkali metal hydroxide.

The invention will be described below in greater detail.

The starting oil used in this invention is a cracked oil fraction obtained by thermal cracking, for example, of petroleums such as naphtha or light oil and having a boiling point of 20° to 220°C. This fraction contains paraffins, monoolefins, diolefins, and aromatic hydrocarbon compounds having 5 to 10 carbon atoms.

The requirement for the starting oil used in this invention is that it should be the above cracked oil fraction and necessarily contain diolefins. The necessity of including diolefins will be described in detail below. Briefly stated, however, it is for the purpose of facilitating the modification of the resin synthesized from the above starting oil. There is no particular restriction on the amount of such diolefins, but preferably, the proportion of the diolefins based on the total amount of the unsaturated components in the starting oil is within the range of 20 to 85% by weight.

Within the boiling point range of 20° to 220°C., a fraction having a lower boiling point, for example, 20 to 80°C., contains large amounts of aliphatic diolefins and monoolefins, and a higher boiling fraction, for example, a fraction having a boiling point of, for example, 140° to 220°C., contains large amounts of unsaturated aromatic compounds. Accordingly, a cracked oil fraction containing diolefins and having a boiling point of 20° to 220°C. may be used as such, or the above fraction may be fractionated, and a fraction having a lower boiling fraction, for example, a fraction having a boiling point of 20° to 80°C. may be used. Or a mixture of the lower boiling fraction and a higher boiling fraction, for example, a fraction having a boiling point of 140° to 220°C. may be used.

There is no particular restriction in other components of the starting oil of this invention other than the diolefins, but the presence of an unsaturated aromatic component is preferred. The preferred amount of this component is about 15 to 80% based on the total unsaturated components.

The diolefins in the starting oil of this invention may either be conjugated or non-conjugated, but in view of the ease of modification, conjugated diolefins are preferred. Of the conjugated diolefins, cyclopentadiene and alkylcyclopentadiene have the tendency to increase the softening point and molecular weight of the resin. Therefore, prior to performing the polymerization, it is preferred to heat the starting oil to 70° to 120°C. to dimerize it.

In the present invention, a hydrocarbon resin is synthesized by polymerizing the above material. The polymerization may be carried out by any of thermal, radical or ionic polymerization process. For commercial operation, the cationic polymerization method using a Friedel-Crafts catalyst is superior.

It is recommended that the cationic polymerization be carried out at a temperature of −30°C. to +60°C. for 10 minutes to 15 hours in the presence of 0.01 to 8% by weight, based on the above starting oil, of a Friedel-Crafts type catalyst such as aluminum chloride, boron trifluoride, a boron trifluoride/diethyl ether complex compound or a boron trifluoride/phenol complex compound. After the polymerization, the catalyst is decomposed with alkali and if desired, washed with water. Further separation of the unreacted oil and low-molecular-weight polymers by evaporation or distillation affords a hydrocarbon resin.

The most suitable softening point of the resin for paper sizes in accordance with this invention is 50° to 95°C. Thus, in view of the rise in softening point ascribable to the modification of the resin to be described hereinbelow, it is preferred that the hydrocarbon to be synthesized by the above polymerization should have a softening point of not more than 45°C.

Hydrocarbon resins having a softening point of not more than 45°C. may be obtained, for example, by a method of heat dimerizing cyclopentadiene or alkyl cyclopentadiene in the starting oil, a method employing an elevated polymerization temperature, a method which comprises adding an alkyl aromatic compound such as toluene or xylene to the starting oil, and then polymerizing the mixture, or a method which comprises polymerizing a mixture of the starting oil and a small amount of an oxygen-containing compound such as a ketone, ester, ether, or phenol. Any of such methods can be employed.

The hydrocarbon resin obtained by the polymerization of the above starting oil usually has a bromine value of at least 40.

According to the process of this invention, the resulting hydrocarbon resin is reacted with an unsaturated dicarboxylic acid or its anhydride. The amount of the unsaturated dicarboxylic acid or its anhydride can be varied over a wide range according to a combination of it with the conditions in the subsequent step. Preferably, the amount of the unsaturated dicarboxylic acid or its anhydride is 0.08 to 0.30 mol per 100 g of the hydrocarbon resin. For example, the reaction is carried out at a temperature of 140° to 250°C. for 30 minutes to 15 hours in the presence of a radical initiator such as an organic peroxide or in the absence of catalyst.

Examples of the unsaturated dicarboxylic acid or its anhydride are maleic acid, maleic anhydride, tetrahydrophthalic acid, tetrahydrophthalic anhydride, and fumaric acid.

In the step of obtaining an acid-modified resin by additionreaction of the hydrocarbon resin with the unsaturated dicarboxylic acid or its anhydride by the above method, the acid can be added in a conversion of nearly 100%. Accordingly, after the addition-reaction, it is not necessary to remove the unreacted matter in particular. But if desired, tiny amounts of the unreacted matter may be removed by introducing a hot inert gas or by reducing the pressure.

Preferably, the acid-modified resin obtained by the above method has a softening point within the range of 50° to 90°C. Resins within this softening point range can be obtained by reacting hydrocarbon resins having a softening point of not more than 45°C. under the abovementioned conditions.

The acid-modified resin so obtained is not suitable for the preparation of paper sizes. When the acid-modified resin is saponified with an aqueous solution of an alkali metal hydroxide such as NaOH, KOH or LiOH, a milk-white emulsion or a transparent aqueous solution of the resin is formed. When this is used as a paper size, its sizing effect is almost nil.

The present invention is characterized in that the above acidmodified resin is further heat-treated at a temperature of 130° to 350°C., preferably 150° to 280°C., in the presence of water or in the presence of an aqueous solution of an alkali metal hydroxide. The inventors of the present application have found out the unexpected result that the resin of this invention obtained by such a method is very superior for the preparation of paper sizes. When the resin in accordance with this invention is saponified in the same way as in the case of rosin using an aqueous solution of an alkali metal hydroxide, and used as a paper size, its sizing effect is superior to that of the rosin-type paper sizes which are considered to have the best sizing effect at present.

The exact cause of this marked increase in sizing effect obtained by this heat-treatment is not known. However, in view of the fact that this heat-treatment results in the decrease of the saponification value of the paper size resin from that of the original acid-modified resin, and also in the evolution of carbon dioxide gas ($CO_2$) as detected by various methods, it is presumed that as a result of the above operation, one of the two unsaturated carboxyl groups added to the resin is converted to carbon dioxide gas to form a monocarboxylic acid resin, and therefore, by the same mechanism as rosin which is a monocarboxylic acid resin, the sizing effect of the resin of this invention is exhibited.

If one of the two unsaturated carboxyl groups added to the resin is necessarily decomposed to carbon dioxide gas, the saponification value of the resin after the above treatment must be 50% of that of the original acid-modified resin. However, in this invention, it is preferred to choose the above heat-treatment conditions so that the saponification value of the intended paper size resin is 50 to 75% of that of the original acid-modified resin. Even when the size resin in accordance with this invention is not a complete monocarboxylic acid resin but the dicarboxyl groups remain to some extent, the sizing effect of the size resin is good. This is probably ascribable to the same reason as that which accounts for the fact that the so-called strengthened rosin size obtained by adding maleic anhydride to rosin and saponifying the adduct has a better sizing effect than the rosin size obtained by saponifying rosin.

The saponification value of the size resin in accordance with this invention is preferably 60 to 140, more preferably 70 to 130, and in order to assure this range of the saponification value, the amount of the unsaturated dicarboxylic acid or its anhydride used for acid modification and the above heat-treatment conditions should be selected properly.

The heat-treatment in accordance with this invention consists in heating the acid-modified resin at a temperature of 130° to 350°C., preferably 150° to 280°C., in the presence of water or an aqueous solution of an alkali metal hydroxide. Even if the same treatment is carried out at a temperature of not more than 130°C., it is impossible to obtain a resin which is easily saponifyable with alkali and exhibits a superior sizing effect. On the other hand, if the treating temperature is above 350°C., the resin becomes deteriorated and an operational risk is involved. Accordingly, temperatures outside the above-specified range should be avoided.

Within the temperature range of 130° to 350°C., the rate of decarboxylation, that is, the rate of decreasing the saponification value, becomes higher at higher temperatures. If a suitable treating time is selected corresponding to the treating temperature selected within this range, a size resin of the desired superior properties can be obtained. Generally, it is preferred that the treating time is 30 minutes to 10 hours.

The presence of water or an aqueous solution of an alkali metal hydroxide during the heat-treatment is essential. However, its amount is not particularly limited. In any case, the amount of the treating liquid can be varied over a range of 5% by volume to 100-fold by volume, preferably 10% by volume to 10-fold by volume. When an aqueous solution of an alkali metal hydroxide is used as the treating liquid, it is sufficient that the total amount of the alkali metal hydroxide contained in the treating liquid is not more than 10 equivalent times (that is, 20 mols) per mol of the dicarboxylic acid or its anhydride bonded to the acid-modified resin, preferably not more than the equivalent of the dicarboxylic acid or its anhydride.

Where the acid-modified resin is heated in the presence of water at a temperature of 130° to 350°C., the reaction mixture after completion of the reaction is separated into an aqueous phase and a solid resin phase. Accordingly, if the water is separated from the resin by a suitable method such as evaporation or decantation, there can be obtained a resin suitable for the preparation of sizes as intended by the present invention.

When in accordance with this invention, the acid-modified resin is heated at a temperature of 130° to 350°C. in the presence of an aqueous solution of an alkali metal hydroxide, there is an advantage that the rate of decrease of the saponification value of the resin becomes faster at the same temperature than in the case of performing the heat-treatment in the presence of water alone. However, in this case, the reaction product is obtained as a solution of the resin in an aqueous medium, and therefore, it is necessary to separate and recover the resin by a suitable operation. For example, the resin can be precipitated by acidifying the reaction mixture. Alternatively, the reaction product is first mixed with a solvent for dissolving the resin, such as benzene or toluene and then the pH of the mixture is rendered acidic, whereupon the resin is transferred into the solvent phase in the form of a carboxylic acid resin. Thus, after separating the solvent phase from the aqueous phase, the resin can be recovered from the solvent phase by a customary method. Furthermore, it is also possible to separate and recover the resin by any other suitable method. Thus, there can be obtained a resin suitable for the production of sizes having superior sizing effects.

The heat-treatment device generally used is a pressure vessel equipped with a stirrer. The acid-modified resin and water or an aqueous solution of an alkali metal hydroxide are placed in this vessel, and then stirred at a temperature of 130° to 350°C.

When water is used in the heat-treatment, the acid-modified resin is placed in a closed vessel and heated at a temperature of 130° to 350°C. Or a superheated steam heated at 130° to 350° C. is blown into the vessel.

The softening point of the paper size resin obtained by the abovedescribed method is the same as that of the original acid-modified resin or is at most about 10°C. higher than the latter. If the softening point of the acid-modified resin is adjusted to 50° to 90°C., the resulting resin has a softening point desirable for a size resin (50° to 95°C.).

A clear aqueous solution of a sizing agent can be obtained by saponifying the resulting paper size resin of this invention with alkali. The method for saponification can be quite the same as a conventional method for preparing a size from rosin. In general, there can be employed a process which comprises adding the size resin to water in which an alkali such as sodium hydroxide or potassium hydroxide is dissolved, and heating the mixture at 70° to 90°C., or a method which involves melting the resin in advance and adding an alkali aqueous solution dropwise.

The size obtained from the resin in accordance with this invention can be used either as an internal size or surface size. It can be used either alone or in conjunction with rosin sizes or strengthened rosin sizes or other sizes now used.

Some characteristic features of this invention are given below.

1. Sizes having superior sizing effects not obtainable with the conventional rosin-type sizes can be obtained only from the resins of this invention without using them in conjunction with rosin.
2. Good quality size resins can be obtained by a very simple process, and this is advantageous from the commercial viewpoint also.
3. Since a natural resin is not at all used, but a material available in abundance is utilized, it is possible to supply the material stably. Furthermore, because of its synthetic nature, the material used in this invention can give a product having uniform superior quality.
4. Alkali saponification can be easily performed in the case of producing a paper size from the resin of this invention, and unlike the conventional petroleum resin sizes, there is no difficulty of saponification or water-solubilization.
5. The saponification product of the resin of this invention exhibit a sizing effect by the same function as the rosin size. Accordingly, the paper-making machine and the paper-making process can be the same as in the case of the rosin-type sizes.

The following Examples illustrate the present invention more specifically. It should be understood however that these Examples are only for illustrative purposes, and in no way limit the present invention.

Example 1

Of cracked oil fractions having a boiling point of 20° to 220°C. and obtained as a by-product of steam cracking of naphtha, a fraction having a boiling point of 20° to 80°C. was heated at 100°C. for 4 hours to thermally dimerize a greater part of cyclopentadiene to dicyclopentadiene, and then re-distilled. A mixture of 75% by weight of the resulting fraction having a boiling point of 20° to 80°C. and 25% by weight of a cracked oil fraction having a boiling point of 140° to 220°C. was used as a starting oil (a gas-chromatographic analysis showed that it contained 45.0% by weight of the entire unsaturated components, 26.5% by weight of conjugated diolefins, and 11.2% by weight of unsaturated aromatics). It was polymerized for 5 hours at 30°C. after adding dropwise 0.7% by weight, based on the starting oil, of a boron trifluoride/phenol complex catalyst and also 0.5% by weight, based on the starting oil, of phenol. Then, the catalyst was decomposed with an aqueous solution of sodium hydroxide, and the polymer was washed with water. Subsequent distillation afforded 38% by weight (based on the starting oil) of a hydrocarbon resin (designated as resin I).

13 Parts by weight of maleic anhydride was added to 100 parts by weight of the hydrocarbon resin (I), and the mixture was stirred at 180°C. for 10 hours to perform an addition-reaction, whereupon an acid-modified resin (I-A) was obtained at an addition rate of 99%. The resin (I-A) had a softening point of 76°C. and a saponification value of 128.

100 Parts by weight of the resin (I-A) and 20 parts by weight of water were placed in an autoclave, and heated at 230°C. for 4 hours with stirring. Then, the aqueous phase was separated, and the resin was dried in a vacuum dryer to form a size resin (I-AH). The resin (I-AH) had a softening point of 83°C. and a saponification value of 85.

The resin (I-AH) was stirred at 80° to 90°C. together with an almost equivalent, to the saponification value of the resin, of potassium hydroxide and water to form a clear size solution with a solids content of 30% by weight and a pH of 10.4.

Comparative Example 1

The acid-modified resin (I-A) obtained by Example 1 was saponified in the same way as in Example 1 to form a clear size solution.

Comparative Example 2

To 100 parts by weight of the hydrocarbon resin (I) obtained in Example 1 was added 8 parts by weight of maleic anhydride, and an addition reaction was performed in the same way as in Example 1 to form an acid-modified resin (I-B) having a softening point of 62°C. and a saponification value of 82. This resin was saponified in the same way as in Example 1 to form a size. But this size was an emulsion-like product which on standing tended to separate.

Comparative test (I) on sizing effects

Tests on sizing effects were carried out using the sizes obtained in Example 1 and Comparative Examples 1 and 2 and a commercially available rosin-type size. The results are shown in Table 1 below. The testing conditions were as follows:

| Pulp: | LBKP degree of beating 40° SR |
|---|---|
| Unit weight: | 65 g/m² |
| Amount of the size added: | Solids content (wt.%) of the size based on the absolute dry weight of the pulp |
| Fixation: | To pH = 4.5 using an aqueous solution of aluminum sulfate |
| Paper-making machine: | TAPPI standard machine |
| Drying: | 105°C., 5 minutes, using a rotary dryer |
| Method for measuring the sizing degree: | JISP - 8122 Stochigt method |

Table 1

| | Resin used for preparation of the size | Amount of the size added (wt.%) | |
|---|---|---|---|
| | | 0.5 | 1.0 |
| Example 1 | I – AH | 24.5 | 48.2 |
| Comparative Example 1 | I – A | 0.0 | 3.0 |
| Comparative Example 2 | I – B | 5.0 | 15.0 |
| Commercially available rosin size | — | 23.8 | 47.5 |

Note:
The numerals in the table represent the sizing degree in seconds.

As shown in the above Table, the resin (I-AH) obtained by the method of this invention exhibited better sizing effects than the commercially available strengthened rosin size, but the resins (I-A) and (I-B) not in accordance with this invention scarcely exhibited a sizing effect. Furthermore, the size derived from the resin (I-B) was a milk-like emulsion and lacked stability.

EXAMPLE 2

A cracked oil fraction having a boiling point of 20° to 220°C. obtained by the steam cracking of naphtha was used as a starting material (a gas-chromatographic analysis showed that is contained 34.8% by weight of the entire unsaturated components, 20.1% by weight of conjugated diolefins, and 7.2% by weight of unsaturated aromatics). The starting oil was polymerized at 30°C. for 5 hours using 0.4% by weight, based on the starting oil, of a boron trifluoride/diethyl ether catalyst, and the polymer was treated in the same way as in Example 1 to form a hydrocarbon resin (II) in a yield of 27% by weight. The resin (II) had a softening point of 37°C. and a bromine value of 80.

To 100 parts by weight of the hydrocarbon resin (II) was added 20 parts by weight of maleic anhydride, and an addition reaction was performed by stirring at 200°C. for 8 hours to form an acid-modified resin (II-A) at an addition rate of 98%. The resin (II-A) had a softening point of 80°C. and a saponification value of 185.

100 Parts by weight of the resin (II-A), 9 parts by weight of sodium hydroxide and 30 parts by weight of water were placed in an autoclave, and the mixture was stirred at 150°C. for 12 hours. The mixture was cooled, and 150 g of benzene was added. An aqueous solution of hydrochloric acid was added dropwise to adjust the pH of the contents to 7, and then the benzene phase was separated from the aqueous phase. The benzene phase was washed with water, and distilled at reduced pressure to evaporate off benzene to obtain the resin (II-AH) having a softening point of 87°C. and a saponification value of 95.

The resin (II-AH) was saponified in the same way as in Example 1 to form a transparent size having a pH of 10.2.

Comparative Example 3

The acid-modified resin (II-A) obtained in Example 2 was saponified in the same way as in Example 1 to form a size having a pH of 10.5.

Comparative test on sizing effects (II)

Under the same test conditions as in Comparative Test (I), the sizing effect of the size obtained in Example 2 was compared with that of the size obtained in Comparative Example 3. The results are shown in Table 2.

Table 2

| | Resin used for preparing the size | 0.5% by weight of the size added |
|---|---|---|
| Example 2 | II – AH | 23.2 |
| Comparative | | |

Table 2-continued

| | Resin used for preparing the size | 0.5% by weight of the size added |
|---|---|---|
| Example 3 | II – A | 0.0 |

Note:
The numerals in the table represent the sizing degrees (seconds).

EXAMPLE 3

The fraction having a boiling point of 20° to 80°C. used in Example 1 (total amount of unsaturated components 49% by weight and the amount of conjugated diolefins 35.0% by weight) was used as a material, and polymerized at 30°C. for 6 hours after adding 0.6% by weight of a boron trifluoride/phenol complex catalyst. The polymer was treated in the same way as in Example 1 to form a hydrocarbon resin (III) in a yield of 32% by weight which had a softening point of less than 30°C. and a bromine value of 93.

To 100 parts by weight of the hydrocarbon resin (III), 15 parts by weight of maleic anhydride was added, and an addition-reaction was performed at 170°C. for 8 hours to form an acid-modified resin (III-A) at an addition rate of 99%. The resin (III-A) had a softening point of 75°C. and a saponification value of 150.

100 Parts by weight of the resin (III-A) and 10 parts by weight of water were placed in an autoclave, and heated at 250°C. for 2 hours with stirring. The aqueous phase was separated, and the resin was dried to form a size resin (III-AH) having a softening point of 84°C. and a saponification value 91.

Each of the resin (III-AH) alone, and a mixture consisting of 70 parts by weight of the resin (III-AH) and 30 parts by weight of rosin (WW grade) was saponified by the same method as in Example 1 to form a size (SIII-AH), and a size (SIII-AHR), respectively, each of which was a transparent aqueous solution having a pH of 10.2, and 10.4, respectively.

Comparative Example 4

Each of the acid-modified resin (III-A) obtained in Example 3, and a mixture consisting of 70 parts by weight of the resin (III-A) and 30 parts by weight of rosin was saponified to form a size (SIII-A) and a size (SIII-AR), respectively, having a pH of 10.2 and 10.5, respectively.

Comparative Example 5

To 100 parts by weight of the hydrocarbon resin (III) obtained in Example 3 was added 8.5 parts by weight of maleic anhydride, and an addition reaction was performed under the same conditions as in Example 5 to form an acid-modified resin (III-B) having a softening point of 67°C. and a saponification value of 89.

Each of the resin (III-B) alone and a mixture consisting of 70 parts by weight of the resin (III-B) and 30 parts by weight of rosin was saponified by the same method as in Example 1. In the case of the resin (III-B) alone, stability was poor after saponification, and separation occurred immediately. Thus, it could not be used as a size.

The size (SIII-BR) obtained by saponifying the mixture of the resin (III-B) and rosin had a pH of 10.5.

Comparative test on sizing effects (III)

| | Resin used in the preparation of the size | Size | Degree of sizing (seconds) when the size was added in an amount of 0.5% by weight |
|---|---|---|---|
| Example 3 | III-AH | SIII-AH | 20.1 |
| do. | III-AH + rosin | SIII-AHR | 20.4 |
| Comparative Example 4 | III-A | SIII-A | 0.0 |
| do. | III-A + rosin | SIII-AR | 6.2 |
| Comparative Example 5 | III-B | not possible to prepare sizes | |
| do. | III-B + rosin | SIII-BR | 17.5 |

The resin (III-AH) in accordance with this invention showed a good sizing effect in combination with rosin, but in the case of Comparative Examples, even the addition of rosin could not result in good sizing effects.

What we claim is:

1. A process for preparing a resin suitable for preparation of sizes, which comprises polymerizing a cracked oil fraction which is obtained by the thermal cracking of petroleums, has a boiling point of 20° to 220°C., and contains diolefins, thereby to form a hydrocarbon resin, reacting the resulting hydrocarbon resin with 0.08 to 0.3 mol of 100 unsaturated dicarboxylic acid or its anhydride per 100g of the hydrocarbon resin, and heating the acid-modified resin in the presence of water or the alkali metal hydroxide at a temperature of 130° to 350°C whereby the acid-modified resin is decarboxylated until the saponification value of the heat treated acid-modified resin is 60°–140°.

2. The process of claim 1 wherein the content of the diolefin in the starting oil is 20 to 80% by weight based on the total amount of unsaturated components in the starting cracked oil fraction.

3. The process of claim 1 wherein the softening point of the hydrocarbon resin is not more than 45°C.

4. The process of claim 1 wherein said unsaturated carboxylic acid or its anhydride is selected from the group consisting of maleic acid, maleic anhydride, tetrahydrophthalic acid, tetrahydrophthalic anhydride and fumaric acid.

5. The process of claim 1 wherein the reaction between the hydrocarbon resin and the unsaturated carboxylic acid or its anhydride is carried out at 140° to 250°C.

6. The process of claim 1 wherein the softening point of said-acid-modified resin is 50° to 90°C.

7. The process of claim 1 wherein the heat-treating temperature is 150° to 280°C.

8. The process of claim 1 wherein the softening point of the resin obtained after the heat-treating temperature is 50° to 95°C.

9. The process of claim 1 wherein the saponification value of the resin obtained after-heat-treatment is 70 to 130.

* * * * *

UNITED STATES PATENT AND TRADEMARK OFFICE
CERTIFICATE OF CORRECTION

PATENT NO. : 3,953,407
DATED : April 27, 1976
INVENTOR(S) : HAYASHI, ET AL.

It is certified that error appears in the above-identified patent and that said Letters Patent are hereby corrected as shown below:

Claim 1, line 7, delete "100", insert -- an --

Claim 1, line 13, delete "60°-140°", insert -- 60 - 140 --

Signed and Sealed this

Thirteenth Day of July 1976

[SEAL]

Attest:

RUTH C. MASON
*Attesting Officer*

C. MARSHALL DANN
*Commissioner of Patents and Trademarks*